United States Patent [19]

Kershner

[11] Patent Number: 4,485,671
[45] Date of Patent: Dec. 4, 1984

[54] MINIATURE ELECTRO-OPTICAL AIR FLOW SENSOR

[75] Inventor: David D. Kershner, Newport News, Va.

[73] Assignee: The United States of America as represented by the Administrator of the National Aeronautics and Space Administration, Washington, D.C.

[21] Appl. No.: 484,745

[22] Filed: Apr. 14, 1983

[51] Int. Cl.³ .................... G01C 21/10; G01C 23/00
[52] U.S. Cl. .................................................. 73/187
[58] Field of Search .................... 73/187, 185, 189

[56] References Cited
U.S. PATENT DOCUMENTS
3,364,741  1/1968  Hickox .................................. 73/187

Primary Examiner—Donald O. Woodiel
Attorney, Agent, or Firm—Howard J. Osborn; John R. Manning; William H. King

[57] ABSTRACT

A sensor for measuring flow direction and airspeed that is suitable, because of its small size, for rapid instrumentation of research airplanes. A propeller driven sphere rotating at a speed proportional to airspeed presents a reflective target to an electro-optical system such that the duty cycle of the resulting electrical output is proportional to yaw angle and the frequency is proportional to airspeed.

7 Claims, 7 Drawing Figures

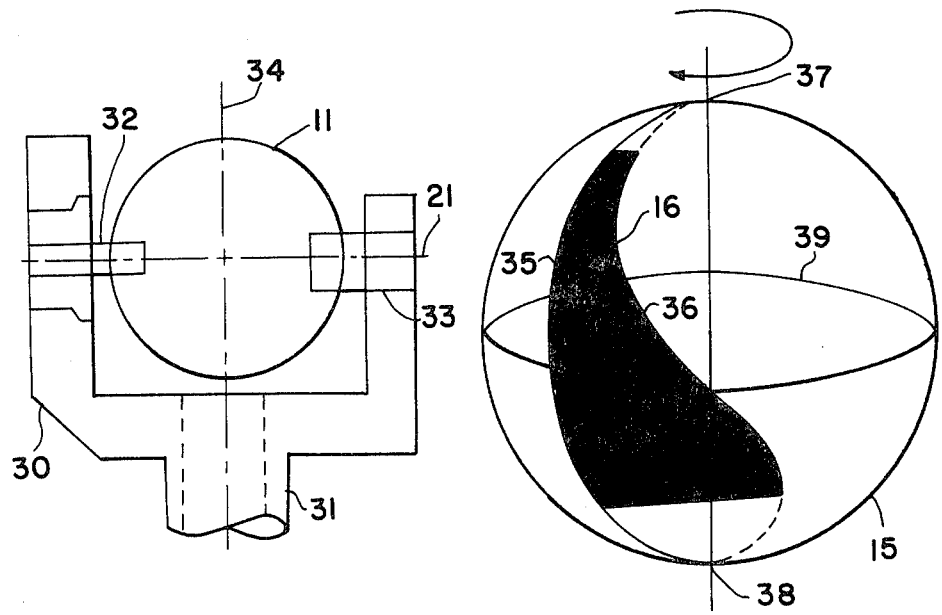
FIG. 2
FIG. 3
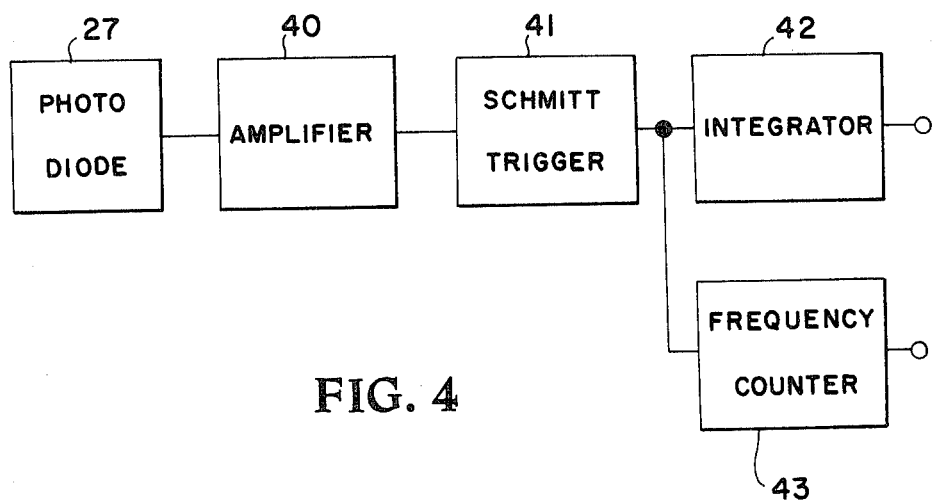
FIG. 4

MINIATURE ELECTRO-OPTICAL AIR FLOW SENSOR

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The invention relates generally to sensors and more specifically concerns a miniature electro-optical flow-direction and airspeed sensor for use on airplanes and remote-controlled models in stability research.

Miniature sensors are needed for rapid and uncomplicated installation on light airplanes engaged in stability research programs. Often, these airplanes are available only for a short time so that preparing and modifying the structure for incorporation of the instrumentation is impossible. Sensors that can be installed by a simple adhesion to a wing, or other surface, often remote from the cabin, are therefore desired. The sensors must be small but at the same time rugged enough to operate reliably in the flight environment. One particularly difficult sensor to miniaturize to this degree has been a flow angle and velocity sensor for measuring the local flow ahead of a wing. A previously developed sensor (Miniature Flow-Direction and Airspeed Sensor for Airplanes and Radio-Controlled Models in Spin Research, NASA TP 1467, May 1979) has been used extensively on a number of government owned airplanes and remote controlled models but because of its large size and complexity, safety considerations require that the sensor be attached to the basic aircraft structure with bolts. This sensor is readily installed on government owned airplanes; but a wider sample of statistical data could be obtained if rented airplanes or airplanes made available by their owners free of charge for short periods of time could be instrumented and tested.

Accordingly, it is a primary object of this invention to provide a miniature flow-direction and airspeed sensor that can be easily and temporarily attached to an aircraft.

Another oject of this invention is to provide a flow-direction and airspeed sensor that eliminates slip rings and the need for electrical leads through moving parts.

A further object of this invention is to provide a flow-direction and airspeed sensor in which the ranges of the phenomena sensed are extremely large.

Still another object of this invention is to provide a simple, inexpensive flow-direction and airspeed sensor for use on aircraft.

Other objects and advantages of this invention will become readily apparent hereinafter in the specification and drawings.

SUMMARY OF THE INVENTION

The invention is a sensor that operates as a free trailing wind vane. The vane, a streamlined body containing a propeller in the nose and a cruciform tail in the rear, self-aligns in an airstream through two independent axes and is attached to the wing surface of an aircraft with a hollow mounting boom. The vane rotates through an angle of ±40 degrees on an axis (yaw axis) through its center of gravity by means of a yoke at the end of a cross-shaft. The cross-shaft fits into a bearing in a stationary pod on the end of the boom, allowing rotation of the vane about its pitch axis.

A sphere having a coded reflective pattern on its surface is mounted on a shaft with the propeller and rotates with the propeller whenever the vane is in an airstream. A light emitting diode (LED) and a photodiode monitors the coded reflective pattern on the sphere to give both the airspeed and the yaw angle. A second LED and photodiode monitors the angular position of the cross-shaft to give the pitch angle.

BRIEF DESCRIPTION OF THE DRAWINGS

FIG. 2 shows the details of how the cross-shaft is attached to the vane in FIG. 1 to provide for the yaw and pitch angles;

FIG. 3 shows a drawing of the reflective pattern on the sphere in FIG. 1;

FIG. 4 is a block diagram of the electrical components used by this invention;

DETAILED DESCRIPTION OF THE INVENTION

Figure 1:
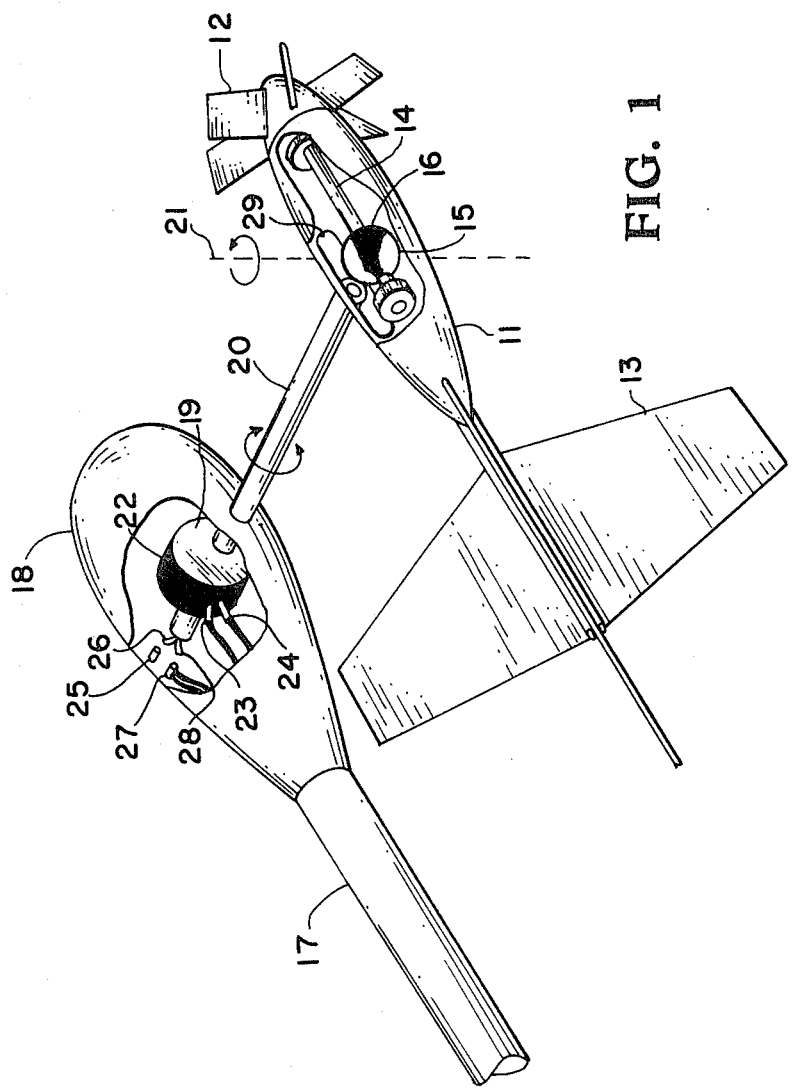
FIG. 1 is a schematic drawing of the invention.

Turning now to the embodiment of the invention selected for illustration in FIG. 1, the number 11 designates a vane which includes a propeller 12 in the nose and a cruciform tail 13 in the rear. A shaft 14 located inside vane 11 has propeller 12 attached to one of its ends and has a sphere 15 attached to its other end to rotate therewith. A coded reflective pattern 16, which will be described later, is located on the surface of sphere 15.

A hollow boom 17 has means (not shown) on its left end for attaching the boom to a wing of an aircraft. At the other end of boom 17 is a pod 18 for housing a disc 19. Disc 19 is attached to one end of a hollow cross-shaft 20 for rotation therewith. The other end of cross-shaft 20 is attached to vane 11 by means of a yoke (see FIG. 2) such that cross-shaft 20 rotates vane 11 about its pitch axis and vane 11 is free to rotate inside the yoke about its yaw axis 21. The pitch axis and the yaw axis intersect at the center of sphere 15.

A wedge shaped reflective strip 22 is located on the rim of disc 19. An LED 23 emits light onto strip 22 and the reflected light is detected by a photodiode 24. The reflectivity of strip 22 continuously varies around the rim of the disc 19. Consequently, the amplitude of the output of photodiode 24 is indicative of the angular position of cross-shaft 20 and hence is indicative of the pitch angle of vane 11.

An LED 25 located inside pod 18 emits light that passes through a fiber optic bundle 26. A photodiode 27 located inside pod 18 detects the light that flows from a fiber optic bundle 28. Fiber optic bundles 26 and 28 are combined and run through cross-shaft 20 to the other end of the shaft where the combined bundle is terminated. The ends of the fibers in the combined bundle are located such that light emitted from the bundle is directed, through an opening 29, at the center of sphere 15. The light reflected back from the surface of sphere 15 passes through the combined bundle and fiber optic bundle 28 to photodiode 27 which produces a signal proportional to the reflected light. Approximately twice as many fibers are in bundle 28 as in bundle 26.

The yoke for attaching shaft 20 to vane 11 is shown in FIG. 2 and is designated by the numeral 30. Yoke 30 has a shaft 31 which includes conventional means (not shown) for attaching the yoke to shaft 20 for rotation therewith. Vane 11 is mounted inside yoke 30 by means of shafts 32 and 33, and suitable bearings for rotation about the Z axis 21. As can be seen from FIG. 2, vane 11 is free to rotate about the Z axis 21 and will rotate about the pitch axis 34 whenever shafts 20 and 31 rotate.

The reflective surface 16 of sphere 15 is shown in more detail in FIG. 3. Surface 16 is bordered on one side by a meridian 35 and on the other side by a line 36. Line 36 starts from a pole 37 and runs toward the opposite pole 38 along a curved path that increases in longitude in direct proportion to the latitude as measured from pole 37. The target area 16 is truncated near poles 37 and 38 since only the equatorial section is covered by the range of yaw, ±40 degrees measured from the equator 39. The constant of proportionality used to determine line 36 can be selected to be unity, in which case the short side of the target will be 50 degrees in longitude from meridian 35 and the long side will be 130 degrees from the meridian. Therefore, the small side of the target reflects over 50 degrees of longitudinal rotation, the long side reflects over 130 degrees of rotation and intermediate locations reflect for periods proportional to their latitude positions.

The output of photodiode 27 as shown in FIG. 4 is amplified by an amplifier 40 and the resulting waves are shaped or squared by a Schmitt trigger 41 to make them uniform. The output of trigger 41 is integrated by an integrator 42 to produce an analog output that is indicative of the rotation of sphere 15 about the yaw axis 21. In addition, the frequency of the output of trigger 41 is determined by a frequency counter 43 which produces an analog output indicative of the frequency of rotation of shaft 14 or the airspeed.

Whenever vane 11 is placed in a flow field of an aircraft, the rotational speed of propeller 12 is proportional to airspeed and the attitude of vane 11 is indicative of the direction of flow of the flow field. The purpose of this invention is to measure the rotational speed of propeller 12 and the attitude of vane 11 about the yaw and pitch axes.

Light is emitted onto rim 22 by means of LED 23 and the reflected light is detected and converted by photodiode 24 to an output signal proportional to the attitude of vane 11 about the pitch axis (axis through the center of shaft 20).

In addition light from an LED 25 passes through fiber optic bundle 26 and then emitted onto sphere 15. The reflected light passes through by fiber optic bundle 28 and then converted to an electrical signal by photodiode 27. Sphere 15, rotating at an angular rate caused by propeller 12 in the airstream, produces a square-wave output from the photodiode 27 with a frequency proportional to airspeed and with a duty cycle, on-time to period, proportional to yaw angle. The resulting electrical signal is integrated by an integrator 42 to give an output signal proportional to the attitude of vane 11 about the yaw axis 21 or yaw angle. The frequency of the resulting electrical signal is counted by a frequency counter 43 to produce an output signal proportional to the rotational speed of propeller 12 or airspeed.

Figure 5:
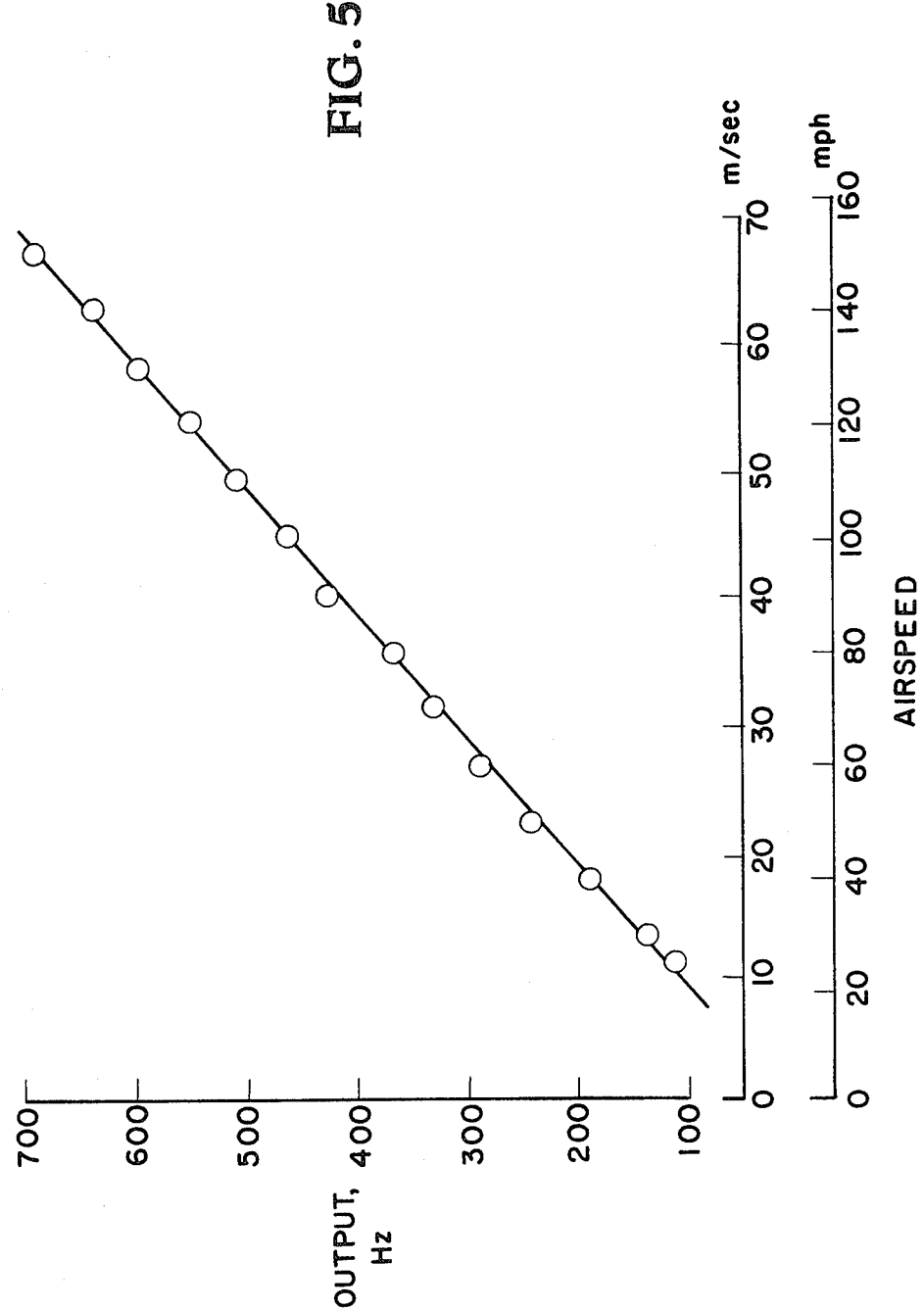
FIG. 5 shows a calibration curve for airspeed.

The accuracy of the sensor was evaluated and found to meet the requirements of the aerodynamicists. The airspeed was calibrated and found repeatable and linear over the flight range to within ±1 m/sec. A free turning propeller responds to volume flow and therefore the output is in proportion to true airspeed, not indicated airspeed, in the absence of significant loading. It can be seen by examining FIG. 5 that after an initial nonlinear increase from the starting point, the data merge quickly to fit a straight line over the remainder of the range. Since the nonlinearity occurs in the region where airplane flight is impossible, this nonlinearity is inconsequential. The dynamic response of the airspeed, a first order system, was measured by analyzing the startup characteristics of the propeller as it is released from a stopped position to final speed while being subjected to a steady airstream. The response is much faster than expected gust or flow angle changes.

Figure 6:
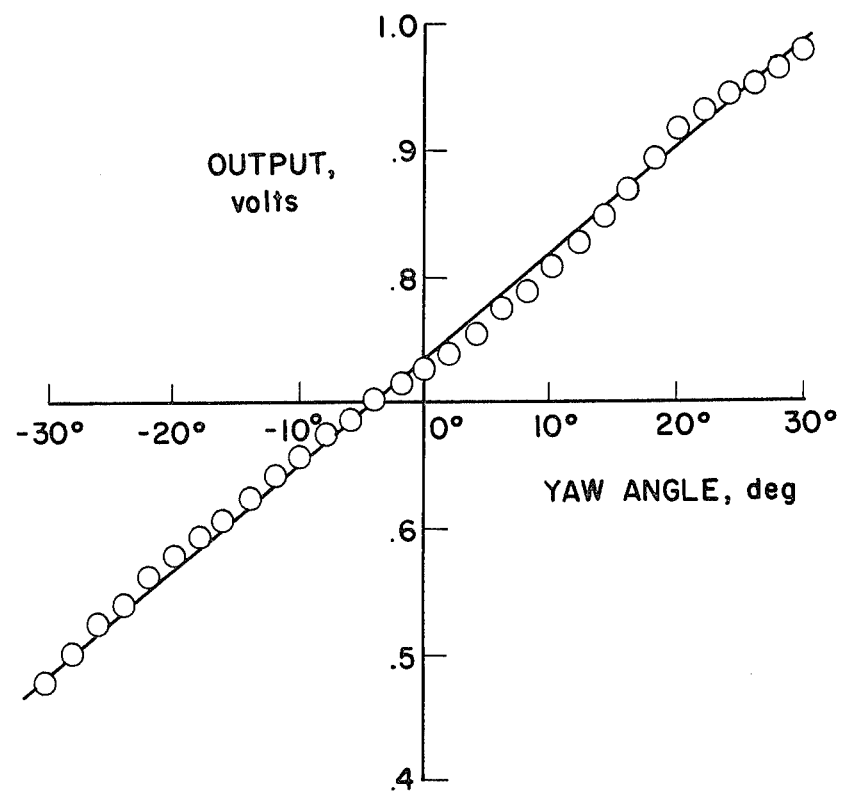
FIG. 6 shows a calibration curve for yaw angle.
Figure 7:
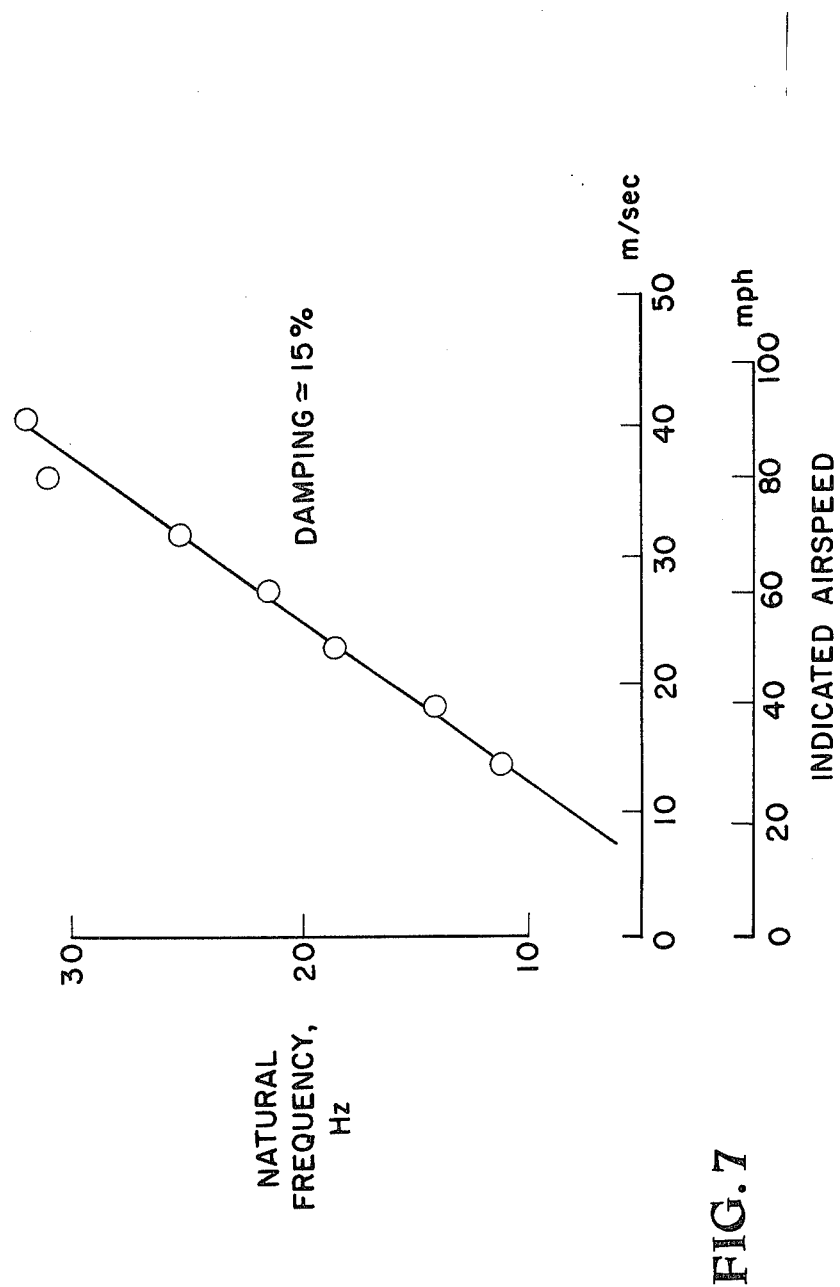
FIG. 7 shows the natural frequency of the vane as a function of airspeed.

The static angular accuracy is determined by analyzing the outputs at known input positions. The angle-of-attack calibration contained some nonlinearity which can be managed in the data analysis. Drift, however is the most troublesome error to manage. Good preflight and postflight calibrations are necessary to eliminate drift effects. The yaw calibration is derived from the rotation of the sphere pattern and is relatively immune from the effects of drift but, as already explained, linearity corrections are introduced in the data analysis program if there are errors in the pattern. The data shown in FIG. 6, for example, contain errors as much as two degrees which must be removed in data reduction. The dynamic responses of each angle measurement are that of a single degree of freedom system of the second order. The natural frequency of the vane bears a linear relationship to the square root of the impact pressure (indicated airspeed) and whatever damping that is present arises from aerodynamical forces produced by the lightweight tail (FIG. 7). It is important to know the natural frequencies likely to be generated in flight. The vane motion can add to the boom motion and produce dangerous divergent oscillations.

The sensor attachment is designed for quick installation and removal from airplanes on flight test programs of a few days duration. The boom fits to a mounting plate which in turn is attached to the wing surface with two sided, neopreme-foam tape. This method of attachment has been shown to be strong enough for the loads of low speed flight.

The advantages of this invention are that it is small in size, it can be rapidly installed on aircraft and it is simple and inexpensive.

What is claimed is:

1. A flow direction and airspeed sensor for use on an aircraft comprising:
  a boom for attachment to the surface of an aircraft at one end of the boom;
  a first shaft mounted at the other end of said boom for rotation with one end of said first shaft extending away from said boom;
  a hollow vane including a propeller with a second shaft attached for rotation with said propeller and extending into the hollow of said vane;
  a sphere attached to said second shaft inside said vane for rotation with said second shaft;
  means for mounting said vane on said one end of said first shaft such that the centerlines of said first and second shafts are perpendicular to each other and intersect at the center of said sphere and such that said vane is free to rotate about a yaw axis through the center of said sphere and perpendicular to each of the said centerlines of said first and second shafts; and electro-optical means for measuring the rotational speed of said second shaft and for measuring the angular attitude of said vane about said yaw axis.

2. A flow direction and airspeed sensor according to claim 1 including a second electro-optical means for measuring the angular position of said first shaft to obtain the attitude of said vane about its pitch axis.

3. A flow direction and airspeed sensor according to claim 1 wherein said electro-optical means for measuring the rotational speed of said second shaft and for measuring the angular position of said vane about said yaw axis comprises a reflective surface partially covering the outside surface of said sphere with the width of said reflective surface continuously increasing in the direction from one of the poles to the other pole of rotation and means for detecting the changes in width of said reflective surface relative to a spot of light emitted onto said sphere perpendicular to said yaw axis and to said second shaft.

4. A flow direction and airspeed sensor according to claim 3 wherein said means for detecting the changes in width of said reflective surface includes means for emitting light on the surface of said sphere the direction of said emitted light being at the center of said sphere and perpendicular to said yaw axis and to said second shaft and means for detecting the reflected light and converting it into an electrical signal.

5. A flow direction and airspeed sensor according to claim 4 including means for producing a first output signal that is proportional to the frequency of said electrical signal whereby the first output signal is proportional to airspeed.

6. A flow direction and airspeed sensor according to claim 5 including a means for integrating said electrical signal to produce a second output signal proportional to the rotation of said vane about the yaw axis.

7. A flow direction and airspeed sensor according to claim 6 including electro-optical means for producing a third output signal proportional to the angular rotation of said first shaft and thus proportional to the angular rotation of said vane about the pitch axis.

* * * * *